United States Patent
Kim (10) Patent No.: US 7,218,303 B2
(45) Date of Patent: May 15, 2007

(54) ALIGNING METHOD UNDER ELECTRIC FIELD FOR FERROELECTRIC LIQUID CRYSTAL AND LIQUID CRYSTAL DISPLAY USING THE SAME

(75) Inventor: Hong Chul Kim, Ahnsan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 356 days.

(21) Appl. No.: 10/608,100

(22) Filed: Jun. 30, 2003

(65) Prior Publication Data
US 2004/0113881 A1 Jun. 17, 2004

(30) Foreign Application Priority Data
Dec. 12, 2002 (KR) ............. 10-2002-0079345

(51) Int. Cl.
*G09G 3/36* (2006.01)
(52) U.S. Cl. ........................... 345/97; 349/191
(58) Field of Classification Search ......... 345/87–97; 349/133, 19, 33, 191
See application file for complete search history.

(56) References Cited

U.S. PATENT DOCUMENTS

| | | | | |
|---|---|---|---|---|
| 5,805,136 A | * | 9/1998 | Silverbrook et al. | 345/695 |
| 6,344,889 B1 | * | 2/2002 | Hasegawa et al. | 349/129 |
| 6,710,759 B1 | * | 3/2004 | Kondoh | 345/92 |
| 6,760,088 B2 | * | 7/2004 | Choi et al. | 349/133 |
| 6,909,412 B2 | * | 6/2005 | Son | 345/87 |
| 6,927,825 B1 | * | 8/2005 | Koma et al. | 349/133 |
| 2002/0085132 A1 | * | 7/2002 | Choi et al. | 349/21 |
| 2004/0169629 A1 | * | 9/2004 | Lee et al. | 345/95 |
| 2004/0246388 A1 | * | 12/2004 | Lee et al. | 349/2 |

FOREIGN PATENT DOCUMENTS

| | | |
|---|---|---|
| JP | 06-160874 | 6/1994 |
| JP | 11-024041 | 1/1999 |
| JP | 2000-267109 | 9/2000 |
| JP | 2000-275684 | 10/2000 |
| JP | 2002-108304 | 4/2002 |

* cited by examiner

*Primary Examiner*—Amr A. Awad
*Assistant Examiner*—Stephen G Sherman
(74) *Attorney, Agent, or Firm*—McKenna Long & Aldridge LLP

(57) ABSTRACT

A method of aligning a ferroelectric liquid crystal (FLC) material capable of facilitating the restoration of an initial alignment of FLC material as a result of mounting of driving circuits includes simultaneously applying a first voltage to a Vcom terminal formed on a source printed circuit board and applying a second voltage to a GND terminal also formed on the source printed circuit board while the first voltage is also applied to a Vcom terminal formed on a gate printed circuit board and while the second voltage is also applied to a GND terminal formed on the gate printed circuit board.

27 Claims, 7 Drawing Sheets

ALIGNMENT WITH
ELECTRIC FIELD

FIG. 5B
RELATED ART

APPLICATION
OF EXTERNAL
ELECTRIC FIELD

ALIGNING METHOD UNDER ELECTRIC FIELD FOR FERROELECTRIC LIQUID CRYSTAL AND LIQUID CRYSTAL DISPLAY USING THE SAME

This application claims the benefit of Korean Patent Application No. P2002-79345, filed on Dec. 12, 2002, which is hereby incorporated by reference for all purposes as if fully set forth herein.

BACKGROUND OF THE INVENTION

1. Field of the Invention

The present invention relates to liquid crystal display (LCDs), and more particularly to a method of restoring a damaged initial alignment of FLC material in the presence of an electric field via driving circuits used in normal driving operations of the LCD and a liquid crystal display using the same.

2. Description of the Related Art

Generally, LCDs display pictures by applying electric fields to a layer of liquid crystal material in response to an applied video signal, wherein the applied electric field controls the orientation liquid crystal molecules within the layer of liquid crystal material and therefore the light transmittance characteristics of the liquid crystal material. LCDs generally include an LCD panel having upper and lower glass substrates separated from each other by a layer of liquid crystal material, a light source (e.g., a back light unit) for emitting light to the liquid crystal display panel, a frame structure, a chassis for securing the LCD panel to the light source as one body, and a printed circuit board (PCB) for applying driving signals to the LCD panel.

LCD panels are generally fabricated by applying substrate cleaning, substrate patterning, substrate bonding, liquid crystal injecting, and drive circuit mounting processes. In the substrate cleaning process, detergent is used to remove impurities found on the surface of substrates used to form the LCD panel. The substrate patterning process includes an upper glass substrate patterning process and a lower glass substrate patterning process. The upper glass substrate of the LCD panel typically supports a color filter layer, a common electrode, a black matrix layer, etc. The lower glass substrate of LCD panel typically supports gate lines, data lines crossing the gate lines, thin film transistors (TFTs) formed at the crossings of the gate and data lines, and pixel electrodes formed in pixel region between the gate and data lines. The substrate bonding and liquid crystal injecting process include steps of spreading and rubbing an alignment film onto the upper and lower glass substrates of the LCD panel, adhering polarizer plates with polarization axes crossing perpendicularly to each other, bonding the upper glass substrate to the lower glass substrate using sealant material, injecting liquid crystal material through a liquid crystal injection hole, and sealing the liquid crystal injection hole. Upon performing the driving circuit mounting process, a lower glass substrate tape carrier package (TCP), on which integrated circuits (ICs) such as a gate drive IC and a data drive IC are mounted, is then connected to a pad part of the lower glass substrate in a tape-automated-bonding (TAB) process. Alternatively, the drive ICs can be mounted directly onto the lower glass substrate using a chip-on-glass (COG) system.

Following the aforementioned LCD panel fabrication processes, a module construction process is performed to fix the LCD panel, the light source, and the PCB together. Upon performing the module construction process, the PCB, the light source, and the LCD panel are sequentially arranged within a bottom cavity of a main frame. Subsequently, a top case is fixed to the main frame such that sides of the main frame and edges of the LCD panel are enclosed. In some cases, a bottom case may be fixed to the main frame such that it is arranged between the main frame and the top case. Accordingly, the bottom case can be used to enclose the bottom surface of the main frame. An input terminal of TCP is generally connected to an output pad of the PCB and an output stage of the TCP is connected to a signal wiring pad of the LCD panel. The light source includes a cold-cathode fluorescent lamp, a light guide panel, and optical sheets (e.g., a prism sheet, a diffusion plate, etc., sequentially arranged between a light guide panel and the LCD panel).

Generally, the liquid crystal material within LCDs exhibits an intermediate material phase between solid and liquid phases wherein liquid crystal molecules exhibit both fluidity and elasticity. Currently, the most common type of liquid crystal material used in LCDs include twisted nematic mode (TN mode) liquid crystal material.

Undesirably, TN mode liquid crystal material has a relatively low response speed and a relatively narrow viewing angle. To overcome the aforementioned problems, TN mode liquid crystal material can be replaced by ferroelectric liquid crystal (FLC) material having a response speed and viewing angle generally greater than that of TN mode liquid crystal material. FLC material exhibits a lamellar structure, wherein each layer of FLC material has the same electric and magnetic properties. Accordingly, when FLC material is driven, molecules of FLC material within the same layer spontaneously rotate (i.e., polarize) along a virtual cone in response to an applied electric field. In the absence of an applied electric field, molecules within the FLC material spontaneously polarize to an original alignment orientation. Accordingly, when external electric fields are applied to the FLC material, molecules within the FLC material rotate rapidly by interaction of an external field and exhibit spontaneous polarization. The response speed of FLC material is typically between a hundred or a thousand times faster than other modes of liquid crystal material. Further, FLC material has an inherent in-plane-switching property and can therefore be used to provide LCDs with wide viewing angles without special electrode structures or compensation films. Further, FLC material has an inherent in-plane-switching property and can therefore be used to provide LCDs with wide viewing angles without special electrode structures or compensation films. Depending on its behavior in the presence of applied electric fields, FLC material may be classified as V-Switching or Half V-Switching Modes.

V-Switching Mode FLC material exhibits the following thermodynamic phase transformations upon decreasing temperature: isotropic→smectic A phase (SA)→smectic X phase (Sm X*)→crystalline. At the isotropic phase, molecules within the FLC material are oriented and distributed substantially isotropically (e.g., randomly). At the smectic A phase (SA) phase, molecules within the FLC material are divided into symmetrically arranged layers of vertically arranged molecules. At the smectic X phase (Sm X*) phase, molecules within the FLC material are arranged according to an intermediate order between smectic A and crystalline phases.

Figure 1:
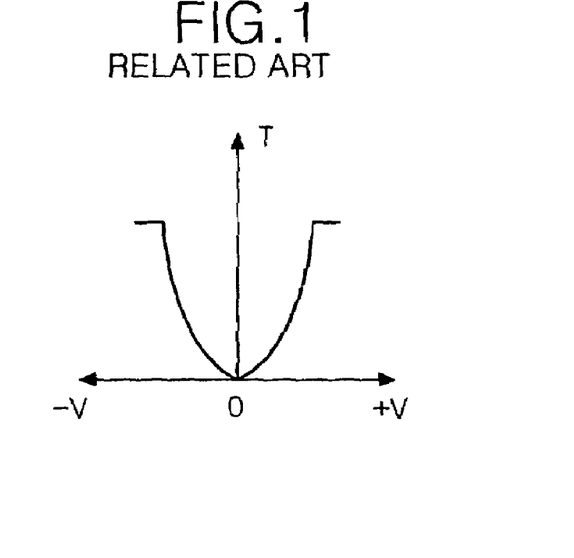
FIG. 1 illustrates a relationship between transmissivity of incident light and driving data voltages applied to V-Switching Mode ferroelectric liquid crystal cells.

FIG. 1 illustrates a graph of transmissivity of incident light versus voltage applied to a V-Switching Mode ferroelectric liquid crystal cell.

Referring to FIG. 1, the transmissivity of light incident to a V-Switching Mode FLC cell exhibiting the smectic X phase (Sm X*) is dependent upon the polarity of an applied driving data voltage (e.g., +V and −V). Accordingly, the arrangement of liquid crystal molecules within V-Switching Mode FLC material may be affected by the applied external voltage. V-Switching Mode FLC material beneficially has high response speed and wide viewing angle characteristics but disadvantageously requires a large amount of power in order to be driven because a capacitance value of the V-Switching Mode FLC material is relatively large. Therefore, a capacitance value of a storage capacitor used to maintain applied data voltages are also be large. Accordingly, if V-Switching Mode FLC material is used LCDs, an aperture ratio of the LCD becomes low since the power consumption of LCD and an electrode area of an auxiliary capacitor increases.

Half V-Switching Mode FLC material beneficially has a high response speed and wide viewing angle characteristics and further has a relatively low capacitance value. Therefore, Half V-Switching Mode FLC material is often used to display moving pictures.

Figure 2:
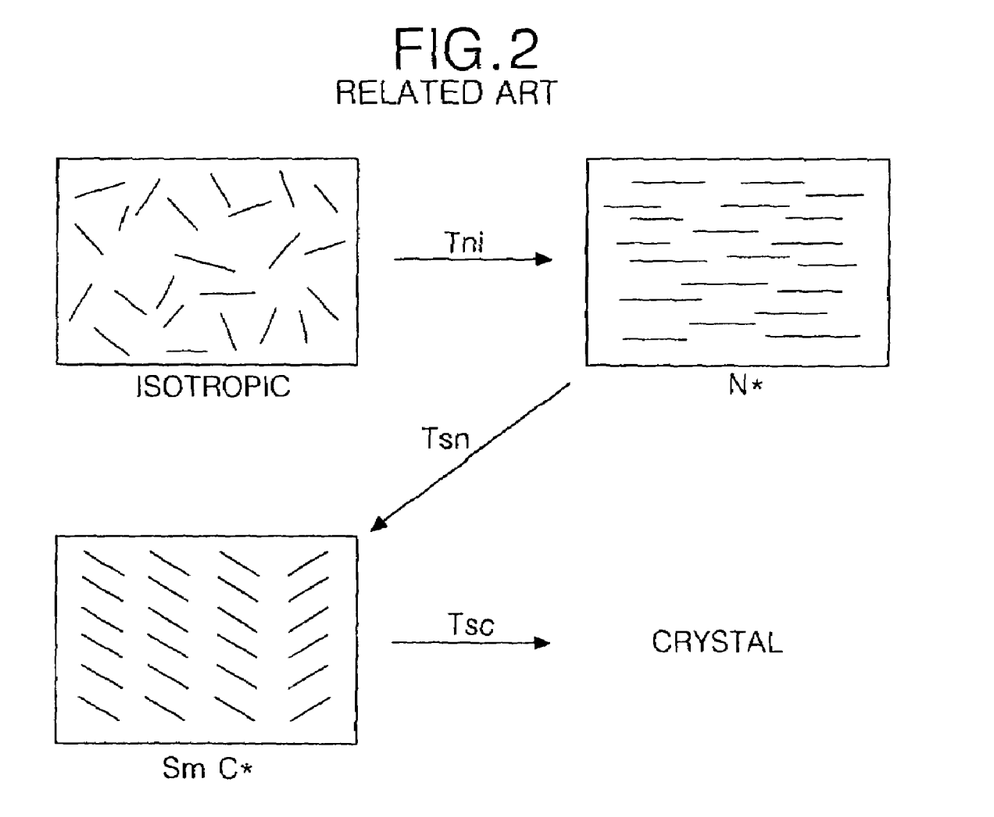
FIG. 2 illustrates phase transformations of Half V-Switching Mode ferroelectric liquid crystal material.

FIG. 2 illustrates phase transformations of Half V-Switching Mode ferroelectric liquid crystal material.

Referring to FIG. 2, upon decreasing temperature below the phase transformation temperature (Tni), Half V-Switching Mode FLC material exhibits a phase transformation from the isotropic to the nematic phase (N*), below phase transformation temperature (Tsn), the Half V-Switching Mode FLC material exhibits a phase transformation from the nematic phase (N*) to the smectic C phase (Sm C*), and below phase transformation temperature (Tcs) the Half V-Switching Mode FLC material exhibits a phase transformation from the smectic C phase to the crystalline phase. Therefore, as the temperature decreases, Half V-Switching Mode FLC material exhibits the following thermodynamic phase transformations: isotropic→nematic (N*)→smectic C phase (Sm C*)→crystalline.

Figure 3:
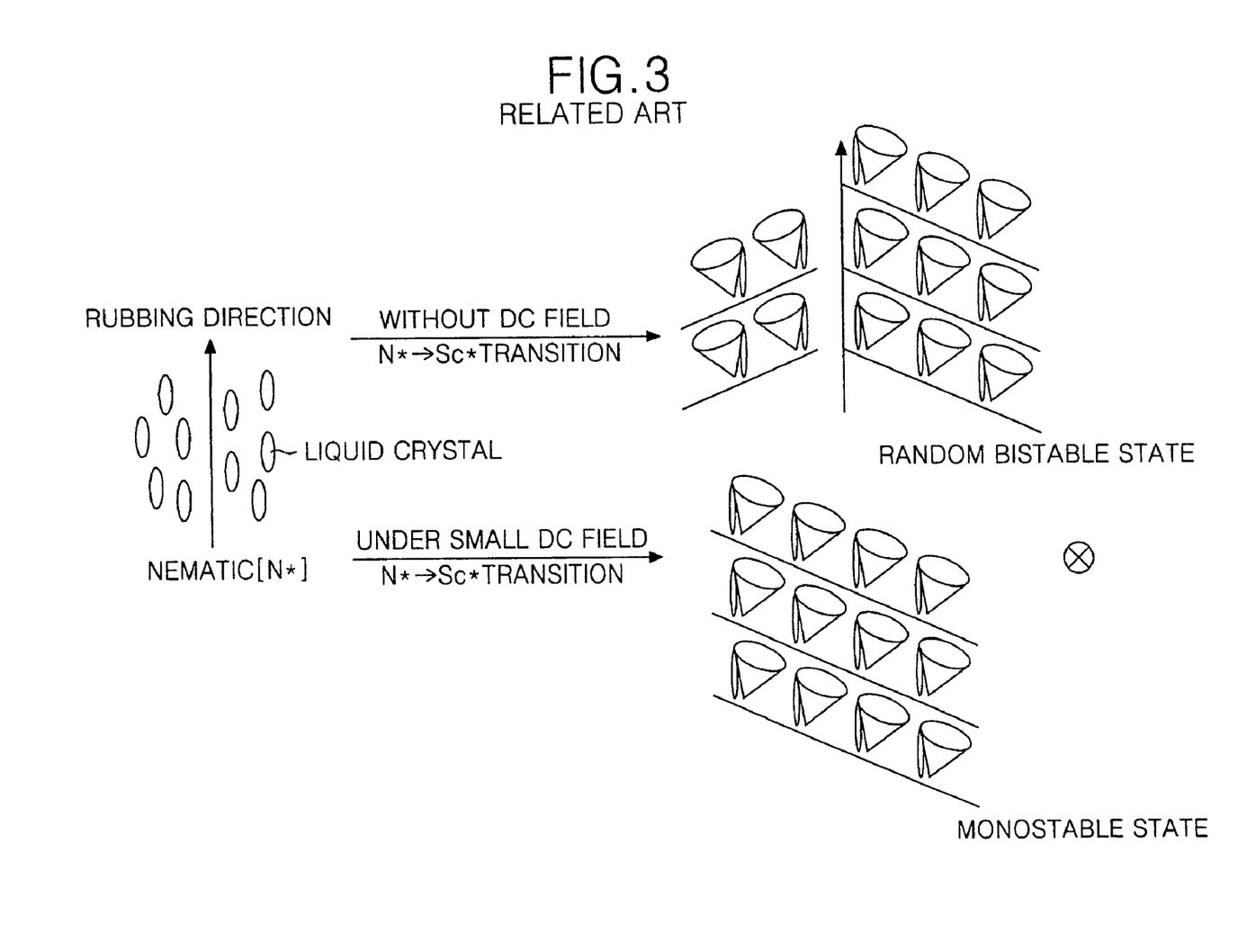
FIG. 3 illustrates the fabrication of a liquid crystal cell including Half V-Switching Mode ferroelectric liquid crystal material.

FIG. 3 illustrates the fabrication of a liquid crystal cell including Half V-Switching Mode FLC material.

Referring to FIG. 3, Half V-Switching Mode FLC material is typically injected into a liquid crystal cell at a temperature above Tni. Accordingly, upon being injected into the liquid crystal cell, molecules within the FLC material are oriented and distributed substantially isotropically (e.g., randomly). Upon lowering the temperature of the FLC material below Tni, molecules within the FLC material become aligned substantially parallel to each other along a direction dictated by the rubbing direction of an orientation layer and the FLC material exhibits the nematic phase (N*). If the temperature of the FLC material is further lowered the temperature below Tsn in the presence of an electric field, the FLC material exhibits the smectic phase (C*) and the liquid crystal molecules spontaneously polarize along the direction of the applied electric field to exhibit a monostable state, wherein liquid crystal molecules uniformly assume one of two possible molecular arrangements. If, on the other hand, the temperature of the FLC material is lowered below Tsn in the absence of the applied electric field, the liquid crystal molecules become separated into layers to exhibit a bistable state, wherein liquid crystal molecules within each layer uniformly assume one of the two possible molecular arrangements. Further, the distribution of the molecular arrangements within the layers is substantially random. In view of the above, it is generally more difficult to uniformly control the FLC material exhibiting the bistable than to uniformly control the FLC material exhibiting the monostable state. Accordingly, the Half V-Mode FLC cells are generally fabricated to exhibit the monostable state by cooling the FLC material below Tsn in the presence of an electric filed generated by applying a small direct current (DC) voltage to the LCD panel.

Referring still to FIG. 3, the symbol "⊗" describes the direction of the applied electric field as extending out of the plane of the illustration. Therefore the spontaneous polarization direction of the FLC material also extends out of the plane of the illustration. Accordingly, electrodes used to generate the applied electric field are formed on upper and lower plates of the liquid crystal cell, extending out of the plane of the illustration. Further, the orientation layer described above is formed on the upper and lower plates.

The V-Switching Mode FLC material is aligned in the applied electric field after the aforementioned substrate bonding and liquid crystal injecting processes. Upon aligning the FLC material, data lines of the LCD panel are commonly connected to a first shorting bar, the small voltage is applied, a scan voltage greater than a threshold voltage of the TFTs is applied to gate lines commonly connected to a second shorting bar, and a common voltage (Vcom) is applied to a common electrode of the upper glass substrate. Accordingly, the common voltage (Vcom), from the common electrode, and the voltage, from the data lines, are applied to the FLC material.

Figure 4A:
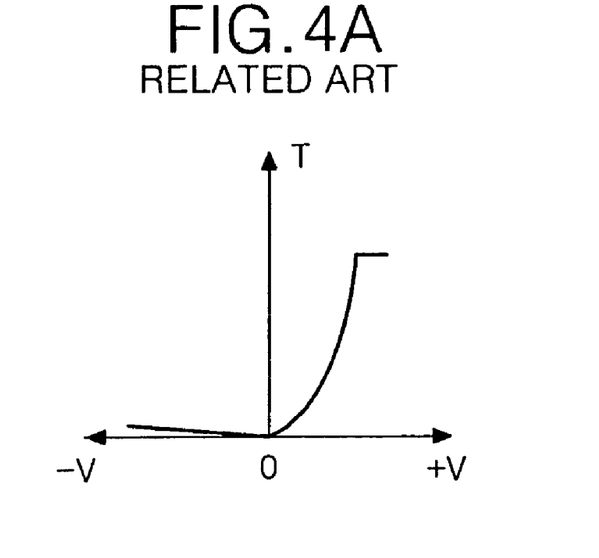
FIGS. 4A and 4B illustrate a relationship between transmissivity of incident light and driving data voltages applied to V-Switching Mode ferroelectric liquid crystal cells aligned in the presence of applied electric fields having opposite polarities.
Figure 4B:
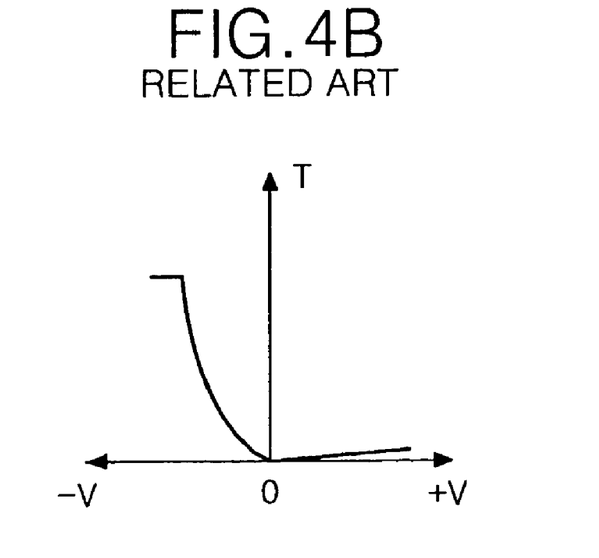

FIGS. 4A and 4B illustrate the dependence of light transmissivity on a voltage applied to a Half V-Switching Mode FLC cell.

Referring to FIG. 4A, Half V-Switching Mode FLC cells containing FLC material aligned in the presence of an applied electric field generated by a voltage having a negative polarity (−V) (i.e., fabricated in the presence of an electric field having a negative polarity), transmit light in the presence of an applied voltage having a positive polarity (+V) by rotating a polarization axis of the light by 90°. The light transmissivity of the Half V-Switching Mode FLC cell increases proportionally to the intensity of an applied positive electric field generated by the positive voltage (+V). Further, the light transmissivity of the Half V-Switching Mode FLC cell attains a maximum value when the intensity of the applied positive electric field is greater than a fixed threshold value of the FLC material. In the presence of an applied voltage having a negative voltage (−V), the Half V-Switching Mode FLC cell does not rotate the polarization axis of the light. Accordingly, in the presence of an applied voltage having a negative polarity, the Half V-Switching Mode FLC cell transmits substantially no light (i.e., the Half V-Switching Mode FLC cell intercepts the light).

Referring to FIG. 4B, Half V-Switching Mode FLC cells containing FLC material aligned in the presence of an applied electric field generated by a voltage having a positive polarity (+V) (i.e., fabricated in the presence of an electric field having a positive polarity), transmit light in the presence of an applied voltage having a negative polarity (−V). Further, in the presence of an applied voltage having a positive polarity (+V), the Half V-Switching Mode FLC cell does not rotate the polarization axis of the light. Accordingly, in the presence of an applied voltage having a positive polarity, the Half V-Switching Mode FLC cell intercepts the light.

Figure 5A:
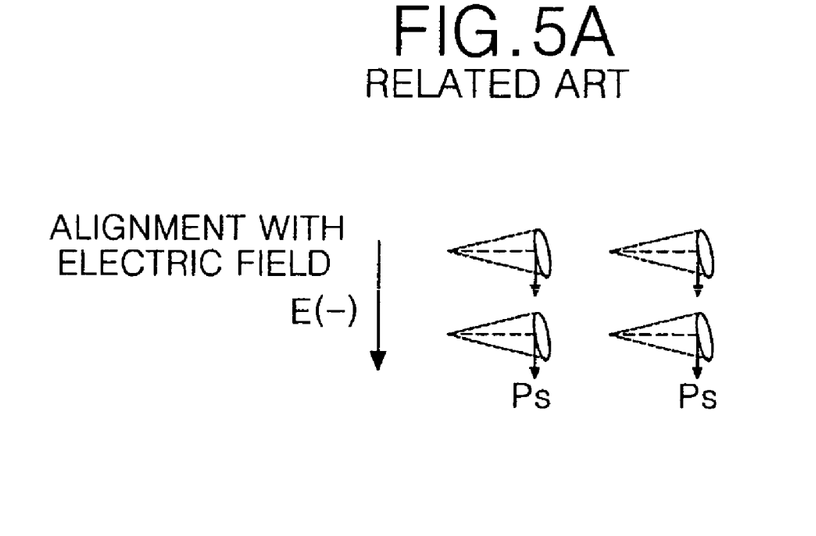
FIGS. 5A and 5B illustrate an orientation of Half V-Switching Mode ferroelectric liquid crystal material aligned in the presence of an applied electric field and orientations of Half V-Switching Mode ferroelectric liquid crystal material driven in the presence of electric fields having polarities substantially identical to, and different from, the polarity of the applied electric field present during the alignment.
Figure 5B:
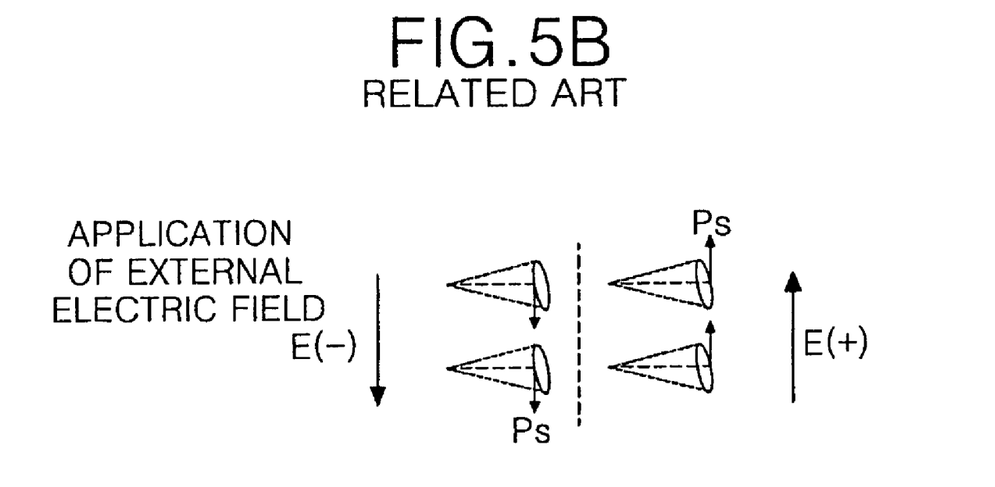

FIGS. 5A and 5B illustrate the orientation directions of Half V-Switching Mode FLC material in the presence of applied electric fields used to fabricate the liquid crystal cell and applied electric fields used to drive the liquid crystal cell, respectively.

Referring to FIG. 5A, when the Half V-Switching Mode FLC cell is fabricated in the presence of an externally applied electric field generated by a voltage having a negative polarity, the spontaneous polarization direction (Ps) of FLC material becomes uniformly aligned to the direction of the externally applied electric field having the negative polarity (E(−)). Referring to FIG. 5B, if, during a subsequent driving of the LCD panel, an electric field having a positive polarity (e.g., an electric field generated by applying a voltage having a positive polarity to the LCD panel) (E(+)) is applied to the fabricated Half V-Switching Mode FLC cell, the FLC material spontaneously polarizes along a spontaneous polarization direction (Ps) uniformly aligned with the direction of the applied electric field having the positive polarity. Accordingly, a polarization state of light incident to a lower plate of the LCD panel may be rotated to substantially align with the polarization direction of an upper polarizer on an upper plate via the FLC material, having the spontaneous polarization direction (Ps) uniformly aligned with the externally applied electric field having the positive polarity, and the incident light is transmitted through the upper plate. If, however, during driving of the LCD panel, the applied external electric field is generated by an applied voltage having a negative polarity (and thus itself has a negative polarity (E(−)), or if, during driving, no electric field is applied, the FLC material remains uniformly aligned along its initial spontaneous polarization direction (Ps) (characterized by the applied electric field having the negative polarity) and the incident light beam is not transmitted through the upper plate (i.e., the light is intercepted by the liquid crystal cell).

Because a cell gap (i.e., the distance between the upper and lower glass substrates of the liquid crystal cell) of related art FLC cells can be as narrow as about 1.2 μm, the alignment of the FLC material, generated in the presence of the applied electric field, may often be easily damaged by external physical impacts. More specifically, upon fabricating ferroelectric LCDs, an initial alignment is imparted to the FLC material after the aforementioned substrate bonding and liquid crystal injecting process. Accordingly, the initial alignment of the FLC material is likely to become damaged upon performing the aforementioned module construction processes, where physical impacts to the LCD panel frequently occur. In order to restore the damaged initial alignment of the ferroelectric FLC material, the TCP must be separated from the LCD panel and the voltage sources used to provide the initial electric-field-alignment must be re-connected to the signal wirings (e.g., the common electrode, the gate lines, and the data lines). The alignment restoration method described above, however, is excessively time consuming and can be extremely difficult to perform. Accordingly, an alignment restoration method that is capable of being more easily implemented is required.

SUMMARY OF THE INVENTION

Accordingly, the present invention is directed to an alignment method under electric field for ferroelectric liquid crystal and liquid crystal display using the same that substantially obviates one or more of the problems due to limitations and disadvantages of the related art.

An advantage of the present invention provides a method of restoring an initial alignment of FLC material in the presence of an electric field via a driving circuit used in normal driving operations of the LCD device and the liquid crystal cell using the same.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method of restoring an initial alignment of FLC material may, for example, include a step of applying a first voltage to a common voltage (Vcom) terminal formed on a source printed circuit board (PCB) while applying a second voltage to a ground (GND) terminal formed on the source PCB; and a step of applying the first voltage to the Vcom terminal formed on a gate PCB while applying the second voltage to the GND terminal formed on a gate PCB.

In one aspect of the present invention, the FLC material may be initially aligned in the presence of an applied electric field while being cooled below a phase transformation temperature, wherein the phase of the cooled FLC material transforms from a nematic phase to a smectic C phase (Sm C*).

In another aspect of the present invention, a voltage level of the first voltage is different from a voltage level of the second voltage.

In still another aspect of the present invention, a difference between the first and second voltages is several volts.

In yet another aspect of the present invention, a substantially no voltage may be applied to the gate lines upon restoring the initial alignment of the FLC material.

In yet a further aspect of the present invention, the gate lines may be provided in a floating state upon restoring the initial alignment of the FLC material.

In still a further aspect of the present invention, a Vcc voltage may not be applied to the source PCB.

In accordance with the principles of another aspect of the present invention, a method of restoring an initial alignment of FLC material may, for example, include setting an analog gamma voltage substantially equal to a first voltage, irrespective of a gray scale value of received data; applying the analog gamma voltage to data lines of the LCD panel; and applying a second voltage to a common electrode of the LCD panel, wherein the second voltage is different from the first voltage.

In one aspect of the present invention, the FLC material may be initially aligned it in the presence of the applied electric field while being cooled below a phase transformation temperature, wherein the phase of the cooled FLC material transforms from a nematic phase to a smectic C phase (Sm C*).

In another aspect of the present invention, substantially no voltage may be applied to gate lines of the LCD panel upon restoration of the initial alignment of the FLC material.

In still another aspect of the present invention, the gate lines may be provided in a floating state upon restoration of the initial alignment of the FLC material.

In accordance with yet another aspect of the present invention, a ferroelectric LCD may, for example, include a gamma circuit for generating a substantially uniform voltage, irrespective of a gray scale value of a first voltage supplied from the GND terminal formed on the source PCB upon aligning the FLC material in the presence of the applied electric field; a data driving circuit for applying the first voltage from the gamma circuit to data lines of the LCD panel upon aligning the FLC material in the presence of the applied electric field; and a common electrode driving circuit for applying the second voltage inputted through the GND terminal formed on the source PCB to the common electrode of the LCD panel.

In one aspect of the present invention, the FLC material may be initially aligned in the presence of an applied electric field while being cooled below a phase transformation temperature, wherein the phase of the cooled FLC material transforms from a nematic phase to a smectic C phase (Sm C*).

In another aspect of the present invention, a voltage level of the first voltage is different from a voltage level of the second voltage.

In still another aspect of the present invention, a difference between the first and second voltages is several volts.

In yet another aspect of the present invention, substantially no voltage may be applied to the gate lines of the LCD panel upon restoration of the initial alignment of the FLC material.

In yet a further aspect of the present invention, the gate lines may be provided in a floating state upon restoration of the initial alignment of the FLC material.

In one aspect of the present invention, the FLC material may be provided as a Half V-Switching Mode FLC material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 6:
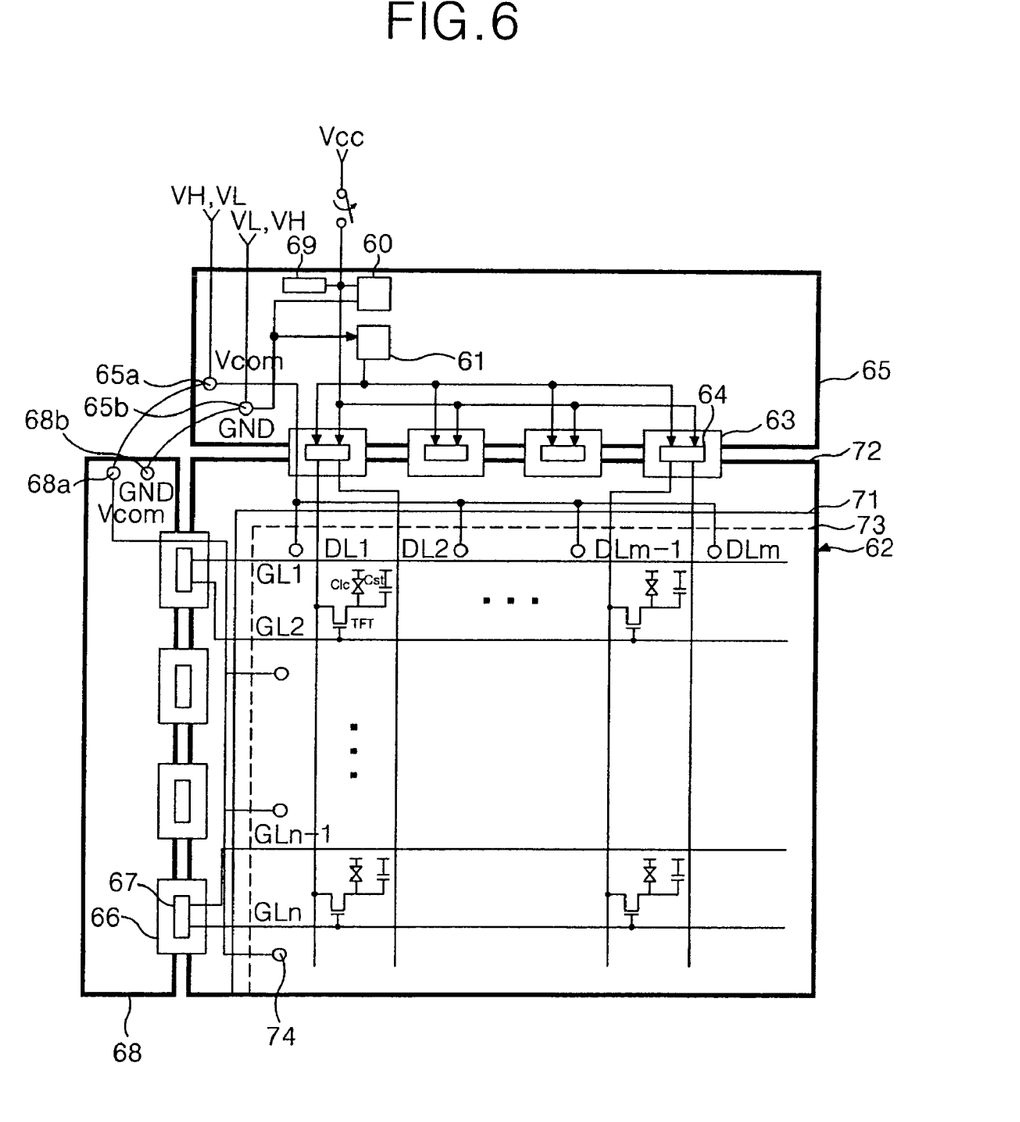
FIG. 6 illustrates a block diagram of a liquid crystal display in accordance with the principles of the present invention.

Referring to FIG. 6, a ferroelectric liquid crystal display (LCD) in accordance with a first aspect of the present invention may, for example, include a liquid crystal display panel 62, into which ferroelectric liquid crystal (FLC) material may be injected, a source tape carrier package (TCP) 63 connected between data lines DL1 to DLm included of the LCD panel 62 and a source printed circuit board (PCB) 65 of the LCD panel 62, and a gate TCP 66 connected between gate lines GL1 to GLn and a gate PCB 68 of the LCD panel 62.

The LCD panel 62 may include a lower glass substrate 71 and an upper glass substrate 72, between which the FLC material may be injected. Polarizing plates may be formed on a light incident surface of the lower glass substrate 71 and on a light display surface of the upper glass substrate 72, wherein polarization axes of the two polarizing plates may be substantially perpendicular to each other. The data lines DL1 to DLm and the gate lines GL1 to GLn may be formed on the lower glass substrate 71 to cross substantially perpendicularly with each other. Thin film transistors (TFTs) may be arranged at crossings of the gate and data lines while liquid crystal cells (Clc) may be defined by the crossings of the gate and data lines. Each TFT may include a gate electrode connected to a corresponding one of the gate lines GL1 to GLn, a source electrode connected to a corresponding one of the data lines DL1 to DLm, and a drain electrode connected to a pixel electrode of a corresponding liquid crystal cell (Clc). Further, a plurality of storage capacitors (Cst) may be formed on the lower glass substrate 71 for maintaining a voltage applied to corresponding ones of the liquid crystal cells (Clc). Each storage capacitor may be formed between the liquid crystal cell (Clc) connected to a successive one of the gate lines GL1 to GLn and to a preceding one of the gate lines GL1 to GLn-1, and also can be formed between the liquid crystal cell (Clc) connected to a successive one of the gate lines GL1 to GLn and a special common line. A black matrix layer, a color filter layer, and a common electrode 73 may be successively formed on the upper glass substrate 72 of the LCD panel 62. The common electrode 73 may be formed out of a transparent, electrically conductive material such as ITO, IZO, and the like, such that light may be transmitted through the common electrode 73. A common voltage (Vcom) may be applied to the common electrode 73 via silver (Ag) dots 74 formed on the lower glass substrate 72. Further, alignment films (not shown) having substantially parallel alignment directions may be formed on each of the upper and lower glass substrates 71 and 72.

According to the principles of the present invention, a timing controller chip 60 and a gamma circuit chip 61 may be mounted onto the source PCB 65.

The timing controller chip 60 may receive vertical/horizontal synchronization signals and a clock signal, generate timing control signals for controlling the source TCP 63 and the gate TCP 66, and may apply the generated timing control signals to the source TCP 63 and to the gate TCP 66. In one aspect of the present invention, the timing controller chip 60 may apply digital video data to the source TCP 63 via a plurality of data buses formed on the source PCB 65.

The gamma circuit chip 61 may generate gamma reference voltages corresponding to six gray scale values of gamma correction by dividing a high potential power voltage (Vdd) and a low potential power voltage (Vss). Further, the gamma circuit chip 61 may generate analog gamma voltages having positive or negative polarities, subdivided in correspondence with each gray scale value, by dividing each generated gamma reference voltage. The analog gamma voltages generated by the gamma circuit chip 61 may be applied to the source TCP 63.

Further, a common voltage (Vcom) terminal 65a may be formed for applying a common voltage (Vcom) to the LCD panel 62 via the source TCP 63 on the source PCB 65. Moreover, a ground (GND) terminal 65b may be formed for applying a ground voltage (GND) to the timing controller chip 60, the gamma circuit chip 61, and to the source TCP 63 formed on the source PCB 65. The common voltage (Vcom) terminal 65a may be connected to silver (Ag) dots 74 formed on the lower glass substrate 72 and, via the wiring formed on the source PCB 65 and the source TCP 63, apply the common voltage (Vcom) to the common electrode 73. In one aspect of the present invention, a connector (not shown) may be connected to a common power (Vcc) supply input terminal of the source PCB 65 for applying a common power voltage (Vcc) of about 3.3V to the LCD panel. In another aspect of the present invention, a power supply circuit 69 may be mounted on the source PCB 65. The common power voltage (Vcc) may be applied to, and drive the timing controller chip 60. Further, the common power voltage (Vcc) may be applied to, and drive the power supply circuit 69.

The power supply circuit 69 may include an AC/DC converter, a pulse width controller, a pulse frequency controller, and the like, and, using the voltage of the common power supply (Vcc), may generate a high potential power voltage (Vdd) greater than about 6V, a common voltage (Vcom) of between about 2.5V and about 3.3 V, a low potential power voltage (Vss), a gate high logic voltage (VGH) of a scan pulse that is greater than about 15V, and a gate low logic voltage (VGL) of the scan pulse that is less than about 4V.

In accordance with the principles of the present invention, data drive chips 64 may be mounted to corresponding ones of the source TCPs 63. Input wirings of the source TCPs 63 may be connected to corresponding output pads of the source PCB 65 and output wirings of the source TCPs 63 may be connected to corresponding ones of data pads formed on the lower glass substrate 72 via an anisotropic conductive film (ACF). The data drive chips 64 may convert digital video data outputted by the timing controller chip 60 into either positive or negative analog gamma voltage in accordance with the gamma circuit chip 61 and may simultaneously apply the analog gamma voltages to all of the data lines DL1 to DLm.

In one aspect of the present invention, the timing control signals may be applied from the source PCB 65 to the gate PCB 68 for controlling the common voltage (Vcom), the ground voltage (GND), the VGH voltage, the VGL voltage, and the gate TCP 66. Similar to the source PCB 65, the gate PCB 68 may be provided with a common voltage (Vcom) terminal 68a and a ground voltage (GND) terminal 68b. The gate TCPs 66 may be connected between output wirings of the gate PCB 68 and corresponding ones of the gate pads formed on the lower glass substrate 72.

In accordance with the principles of the present invention, gate drive chips 67 may be mounted to corresponding ones of the gate TCPs 66. Input wirings of the gate TCPs 66 may be connected to corresponding ones of the output pads of the gate PCB 68 and output wirings of the gate TCPs 66 may be connected to corresponding ones of gate pads formed on the lower glass substrate 72 via an anisotropic conductive film (ACF). The gate drive chips 67 may sequentially apply scan pulses to the gate lines GL1 to GLn in response to the timing control signals outputted by the timing controller chip 60.

A method of initially aligning the FLC material within the ferroelectric liquid crystal display of the present invention will now be explained in greater detail.

In accordance with the principles of the present invention, the FLC material may be provided as Half V-Switching Mode FLC material. In one aspect of the present invention, the FLC material may be injected at a temperature at which the FLC material exhibits an isotropic phase. The temperature of the injected FLC material exhibiting the isotropic phase may be lowered below a first phase transformation temperature (Tni) such that the cooled injected FLC material exhibits a nematic phase (N*). Next, the temperature of the cooled FLC material exhibiting the nematic phase (N*) may be lowered below a second phase transformation temperature (Tsn) while applying an electric filed to the LCD panel sufficient to induce a spontaneous polarization of the FLC material. Accordingly, the FLC material may be aligned in correspondence with the applied electric field as the FLC material is cooled to exhibit a smectic C phase (Sm C*). Upon combining the cooling and application of the electric field, a FLC material exhibiting the monostable state may be obtained. In one aspect of the present invention, the injection temperature may be about 100° C. In another aspect of the present invention the first phase transformation temperature (Tni) may be about 90° C. to about 100° C. In still another aspect of the present invention, the second phase transformation temperature (Tsn) may be about 60° C. to about 80° C. The first and second transformation temperatures (Tni and Tsn, respectively) may vary according to the type of FLC material injected. In yet another aspect of the present invention, the applied electric field may be generated by applying a direct current voltage to upper and lower electrodes of the LCD panel. In one aspect of the present invention, the direction of the spontaneous polarization of the FLC material may be substantially identical to a direction of the applied electric field. In one aspect of the present invention, the FLC material may be injected into the liquid crystal cells of the LCD panel at a temperature at which the liquid crystal material exhibits the nematic (N*) phase. In another aspect of the present invention, the FLC material may be dispensed onto one of the substrates, rather than being injected between the two substrates. Accordingly, after the FLC material is dispensed onto one of the substrates, the other of the substrates on which the FLC material is not dispensed is bonded to the substrate having the dispensed FLC material.

If, after the FLC material is initially aligned, the initial alignment becomes deteriorated, the principles of the present invention may be applied to restore the initial alignment of the FLC material. Therefore, the principles of the present invention may be extended to provide a method of aligning FLC material. Accordingly, the FLC material may be aligned in the absence of a common power voltage (Vcc) applied to the source TCP 63. By applying a DC voltage of several volts to the common voltage (Vcom) terminals 65a and 68a and to the ground (GND) terminals 65b and 68b formed on each of the source PCB 65 and the gate PCB 68, respectively, however, the FLC material may be aligned. Because the common power voltage (Vcc) is not applied to the timing controller chip 60 or to the power supply circuit 69, the high potential power voltage (Vdd) and the low potential power voltage (Vss) are not applied to the gamma circuit chip 61.

Figure 7:
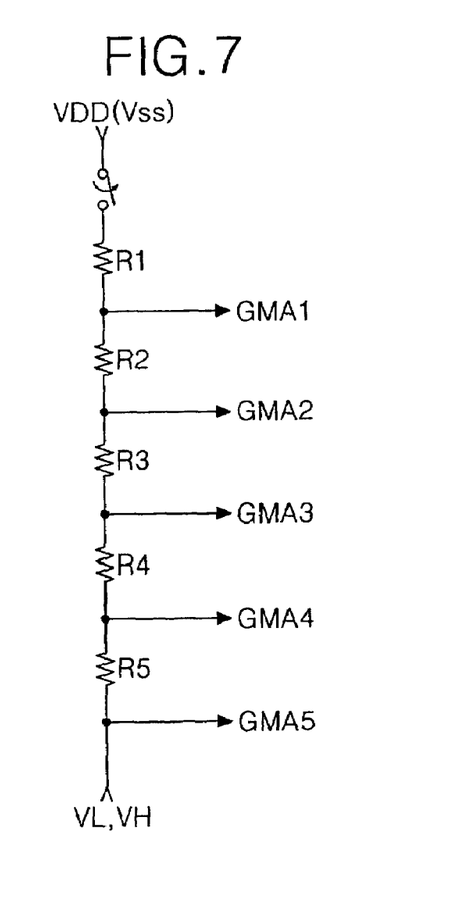
FIG. 7 illustrates an equivalent circuit diagram of a gamma circuit within the gamma circuit chip shown in FIG. 6.
Figure 8:
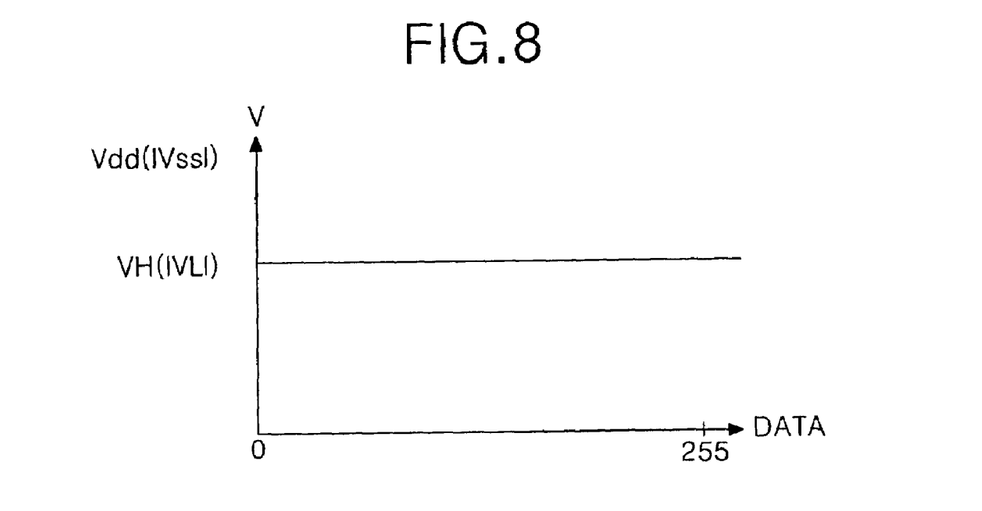
FIG. 8 illustrates a graph of a gamma voltage outputted from the gamma circuit chip shown in FIG. 6.

Referring now to FIG. 7, the gamma circuit chip 61 may include a voltage dividing circuit including a plurality of voltage-dividing resistors R1 to R5. In the absence of an applied common power voltage (Vcc), the high potential power voltage (Vdd) and the low potential power voltage (Vss) are not applied to the gamma circuit chip 61. Therefore, the input terminal of the voltage dividing circuit is placed in a floating state and current does not flow through the voltage-dividing resistors R1 to R5. Accordingly, a voltage equivalent to the high or low potential of the direct current (DC) voltage (VH or VL, respectively), inputted from the GND terminal 65b and 68b, may be applied to the output nodes GMA1 to GMA5, corresponding to each gamma reference voltage, formed between the voltage dividing resistors R1 to R5. Further, the voltage equivalent to the high or low potential of the DC voltage (VH or VL, respectively), inputted from the GND terminal 65b and 68b, may also be applied to the each output terminal of the voltage dividing circuit for generating gamma voltages subdivided by re-dividing each gamma voltage. Therefore, and as shown in FIG. 8, the analog gamma voltage applied to the data drive chips 64 from the gamma circuit chip 61 may become substantially uniform, or constant, and may be formed independently of any gray scale value of digital video data signals supplied to the data drive chips 64.

In accordance with the principles of the present invention, the initial alignment of the FLC material may be restored (e.g., the FLC material may be aligned) in the presence of an electric field by applying the high potential DC voltage (VH) to the Vcom terminals 65a and 68b while applying the low potential DC voltage (VL) to the GND terminals 65b and 68b. In another aspect of the present invention, the FLC material may be aligned in the presence of an applied electric field by applying the low potential DC voltage (VL) to the Vcom terminals 65a and 68a while applying the high potential DC voltage (VH) to the GND terminals 65b and 68b. In yet another aspect of the present invention, the difference between the high potential DC voltage (VH) and the low potential DC voltage (VL) may be up to several volts such that the FLC material may be suitably aligned in the presence of an applied electric field.

If the high potential DC voltage (VH) is applied to the Vcom terminals 65a and 68a while the low potential DC voltage (VL) is applied to the GND terminals 65b and 68b, the high potential DC voltage (VH) may be applied to the common electrode 73 formed on the upper glass substrate 71 via the Vcom terminal 65a and 68a in addition to the silver (Ag) dots 74 while the low potential DC voltage (VL) may be applied to the pixel electrodes (not shown) of each liquid crystal cell (Clc). In one aspect of the present invention, the pixel electrodes face the common electrode 73 and are separated from the common electrode 73 by the FLC material.

Figure 9:
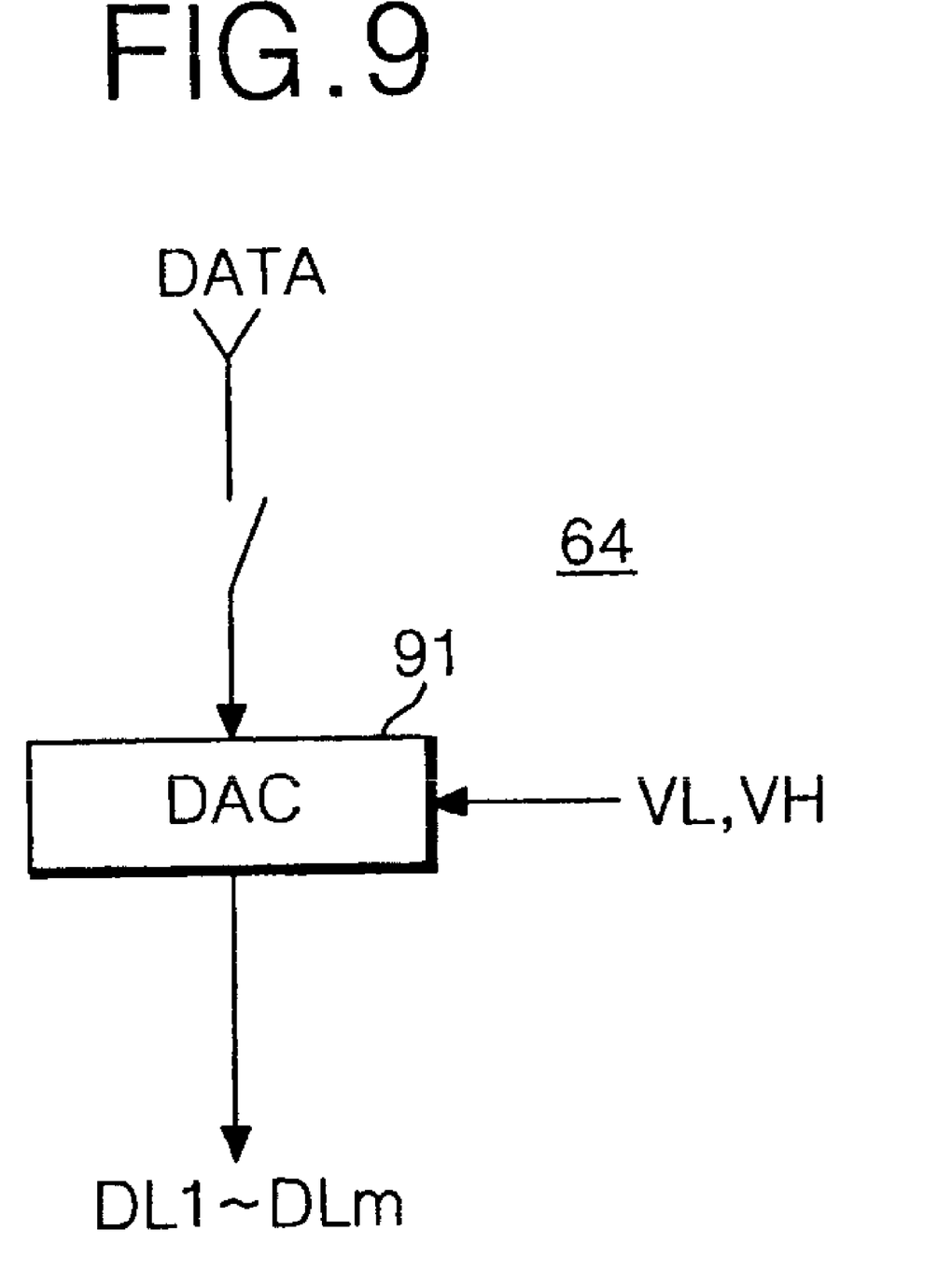
FIG. 9 illustrates a block diagram of a digital-to-analog converter of the data drive chip shown in FIG. 6.

Because the timing controller chip 69 does not drive the data drive chips 64, data voltages may either not be applied to the data lines DL1 to DLm or may be applied randomly to the data lines DL1 to DLm. Accordingly, the data voltages applied to the data drive chips 64 may be '000000' (or '00000000') or represent some randomly selected gray scale value. As shown in FIG. 9, the digital-to-analog converter (DAC) 91 of the data drive chips 64 may convert the digital video data into analog gamma voltages and, as shown in FIG. 8, apply the low potential DC voltage (VL), transmitted from the GND terminals 65b and 68b, to data lines DL1 to DLm, independently of the gray scale value of the digital video data.

If the low potential DC voltage (VL) is applied to the Vcom terminals 65a and 68a while the high potential DC voltage (VH) is applied to the GND terminals 65b and 68b, the low potential DC voltage (VL) may be applied to the common electrode 73 formed on the upper glass substrate 71 via the Vcom terminals 65a and 68a in addition to the silver (Ag) dots 74 while the high potential DC voltage (VH) may be applied to the pixel electrode of each liquid crystal cell (Clc). In one aspect of the present invention, the pixel electrodes face the common electrode 73 and are separated from the common electrode 73 by the FLC material.

Because, upon restoration of the initial alignment of the FLC material, the common power voltage (Vcc) is not applied to the timing controller chip 60 or to the power supply circuit 69, when the electric field is applied, neither the gate high logic voltage (VGH) nor the gate logic low voltage (VGL) are generated by the power supply circuit 69. In the absence of any applied gate logic voltage, the gate lines GL1 to GLn are maintained in a floating state (e.g., substantially zero volts are applied to the gate lines). Therefore, upon aligning the FLC material in the presence of the applied electric field, the data voltage transmitted by the data lines DL1 to DLm may be applied to the pixel electrodes of each liquid crystal cell (Clc) within the LCD panel as a leakage current of the TFT.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of aligning ferroelectric liquid crystal material in the presence of an applied electric field, comprising:
   providing a liquid crystal display (LCD) panel having a plurality of gate lines, a plurality of data lines, and a plurality of ferroelectric liquid crystal (FLC) cells;
   providing FLC material within the FLC cells;
   applying an electric field to the FLC cells to impart an initial alignment to the provided FLC material;
   providing a data drive circuit for driving the plurality of data lines;
   providing a gate drive circuit for driving the plurality of gate lines;
   providing a source printed circuit board (PCB) connected to the LCD panel through the data drive circuit, wherein the source PCB includes a common voltage terminal and a ground voltage terminal;
   providing a gate PCB connected to the LCD panel through the gate drive circuit, wherein the gate PCB includes a common voltage terminal and a ground voltage terminal; and
   aligning the initially aligned FLC material in all of the FLC cells simultaneously, the aligning comprising:
   applying a first voltage to the common voltage terminal on the source PCB;
   applying a second voltage to the ground voltage terminal on the source PCB simultaneously with the first voltage to the common voltage terminal on the source PCB;
   applying the first voltage to the common voltage terminal formed on the gate PCB; and applying the second voltage to the ground terminal formed on the gate PCB simultaneously with the first voltage to the common voltage terminal formed on the gate PCB.

2. The method of aligning ferroelectric liquid crystal material according to claim 1, wherein providing the FLC material includes injecting the FLC material.

3. The method of aligning ferroelectric liquid crystal material according to claim 1, wherein providing the FLC material includes dispensing the FLC material.

4. The method of aligning ferroelectric liquid crystal material according to claim 1, wherein the initial alignment of the FLC material is deteriorated prior to aligning the initially aligned FLC material.

5. The method of aligning ferroelectric liquid crystal material according to claim 4, wherein aligning the initially aligned FLC material substantially restores the initial alignment of the FLC material.

6. The method of aligning ferroelectric liquid crystal material according to claim 1, wherein the FLC cell includes Half V-Switching Mode FLC material.

7. The method of aligning ferroelectric liquid crystal material according to claim 1, wherein the FLC material is initially aligned in the presence of the applied electric field while being cooled below a phase transformation temperature, wherein the phase of the cooled FLC material transforms from a nematic phase to a smectic C phase.

8. The method of aligning ferroelectric liquid crystal material according to claim 1, wherein the first voltage is greater than the second voltage.

9. The method of aligning ferroelectric liquid crystal material according to claim 1, wherein the second voltage is greater than the first voltage.

10. The method of aligning ferroelectric liquid crystal material according to claim 1, wherein substantially no voltage is applied to the gate lines upon aligning the initially aligned FLC material.

11. The method of aligning ferroelectric liquid crystal material according to claim 1, further comprising providing the gate lines in a floating state upon aligning the initially aligned FLC material.

12. The method of aligning ferroelectric liquid crystal material according to claim 1, wherein a common power voltage is not applied to the source PCB upon aligning the initially aligned FLC material.

13. A method of aligning ferroelectric liquid crystal material display panel, comprising:
   providing a liquid crystal display (LCD) panel having a plurality of gate lines, a plurality of data lines, and a plurality of liquid crystal cells containing initially aligned ferroelectric liquid crystal (FLC) material;
   setting an analog gamma voltage substantially equal to a first voltage, wherein the analog gamma voltage is set independently of a gray scale value of a digital video data;
   applying the first voltage to the plurality of data lines; and
   aligning the initially aligned FLC material in all of the FLC cells simultaneously by applying a second voltage to a common electrode of the LCD panel, wherein the second voltage is different from the first voltage.

14. The method of aligning ferroelectric liquid crystal material according to claim 13, wherein the initial alignment of the FLC material is deteriorated prior to aligning the initially aligned FLC material.

15. The method of aligning ferroelectric liquid crystal material according to claim 14, wherein aligning the initially aligned FLC material substantially restores the initial alignment of the FLC material.

16. The method of aligning ferroelectric liquid crystal material according to claim 13, wherein the FLC cell includes Half V-Switching Mode FLC material.

17. The method of aligning ferroelectric liquid crystal material according to claim 13, wherein the FLC material is initially aligned in the presence of the applied electric field while being cooled below a phase transformation temperature, wherein the phase of the cooled FLC material transforms from a nematic phase to a smectic C phase.

18. The method of aligning ferroelectric liquid crystal material according to claim 13, wherein substantially no voltage is applied to the plurality of gate lines upon aligning the initially aligned FLC material.

19. The method of aligning ferroelectric liquid crystal material according to claim 13, further comprising providing the gate lines in a floating state upon aligning the initially aligned FLC material.

20. A ferroelectric liquid crystal display, comprising:
   a liquid crystal display (LCD) panel having a plurality of gate lines, a plurality of data lines, a plurality of ferroelectric liquid crystal (FLC) cells containing FLC material having an initial alignment, and a common electrode;
   a source printed circuit board (PCB) including a ground voltage terminal for applying a first voltage and a common voltage terminal for applying a second voltage;
   a data driving circuit for driving the plurality of data lines, wherein the LCD panel is electrically connected to the source PCB via the data driving circuit;
   a gamma circuit for generating a substantially uniform voltage independent of a gray scale value of a digital video data using the first voltage, wherein the first voltage is transmittable to the plurality of data lines via the data driving circuit upon an alignment of the initially aligned FLC material in all of the FLC cells simultaneously; and
   a common electrode driving circuit for applying the second voltage to the common electrode upon the alignment of the initially aligned FLC material.

21. The ferroelectric liquid crystal display according to claim 20, wherein an alignment of the initially aligned FLC material is restorable in the presence of the first and second voltages.

22. The ferroelectric liquid crystal display according to claim 20, wherein the FLC cell includes Half-Switching Mode FLC material.

23. The ferroelectric liquid crystal display according to claim 20, wherein the FLC material is initially aligned in the presence of the applied electric field while being cooled below a phase transformation temperature, wherein the phase of the cooled FLC material transforms from a nematic phase to a smectic C phase.

24. The ferroelectric liquid crystal display according to claim 20, wherein the first voltage is greater than the second voltage.

25. The ferroelectric liquid crystal display according to claim 20, wherein the second voltage is greater than the first voltage.

26. The ferroelectric liquid crystal display according to claim 20, further comprising a gate driving circuit for driving the plurality of gate lines, wherein substantially no voltage is appliable to the gate lines in the presence of the applied first and second voltages.

27. The ferroelectric liquid crystal display according to claim 20, wherein the gate lines are provided in a floating state in the presence of the applied first and second voltages.

* * * * *